(12) United States Patent
Vadivelu

(10) Patent No.: US 6,629,001 B1
(45) Date of Patent: Sep. 30, 2003

(54) CONFIGURABLE CONTROLLER FOR AUDIO CHANNELS

(75) Inventor: Karthi R. Vadivelu, Fair Oaks, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/396,979

(22) Filed: Sep. 15, 1999

(51) Int. Cl.[7] .................................................. G06F 17/00
(52) U.S. Cl. .................................. 700/94; 710/33; 710/8
(58) Field of Search .......................... 710/8, 15, 4, 10, 710/22, 3, 33

(56) References Cited

U.S. PATENT DOCUMENTS 5,402,499 A * 3/1995 Robison et al. .......... 379/88.13
6,128,597 A * 10/2000 Kolluru et al. ............. 704/270
6,209,042 B1 * 3/2001 Yanagisawa et al. .......... 710/3
6,215,748 B1 * 4/2001 Greenwood et al. ..... 369/275.3
6,263,381 B1 * 7/2001 Freadman .................... 710/10

* cited by examiner

Primary Examiner—Forester W. Isen
Assistant Examiner—B. Tyrone Pendleton
(74) Attorney, Agent, or Firm—Blakely, Sokoloff, Taylor & Zafman LLP

(57) ABSTRACT

The present invention is a method and apparatus to control audio channels. Configuration registers configure usage of the audio channels. A plurality of channel logic circuits are coupled to the corresponding configuration registers to provide logic functions to the audio channels according to the configured usage.

21 Claims, 6 Drawing Sheets

CONFIGURABLE CONTROLLER FOR AUDIO CHANNELS

BACKGROUND

1. Field of the Invention

This invention relates to microprocessors. In particular, the invention relates to audio control.

2. Description of Related Art

Audio functionalities have been increasingly incorporated in modern microprocessor systems. Advanced features in audio systems such as stereo full duplex codec and three-dimensional stereo enhancement typically found in home entertainment systems can now be included in a personal computer (PC).

To accommodate the increasing demand for audio processing, especially in the digital domain, the computer industry is standardizing audio components with advanced features. One such standard is the Audio Codec '97 as documented in the Audio Codec '97 Component Specification Revision 1.02, dated May 28, 1996, published by Intel Corporation ("AC '97 Specification").

The AC '97 is an analog input/ output (I/O) component of a two-chip PC audio solution. The AC '97 analog component performs fixed 48K sample rate digital-to-analog and analog-to-digital conversions (DAC and ADC), mixing, and analog processing (e.g., tone, 3D stereo enhancement). The AC '97 typically serves as a slave to an AC '97 digital controller.

The AC '97 digital controller is interfaced to the AC '97 analog component through a standardized AC-link digital serial interface protocol as specified in the AC '97 Specification. The audio subsystem may include a number of audio channels. A digital audio controller controls these audio channels by sending and receiving digital data streams at pre-defined time slots in a serial data link.

Traditional techniques to implement the digital audio controller include a fixed set of logic circuits serving a fixed set of audio channels. This approach has a number of disadvantages. First, the amount of hardware in the digital audio controller is excessive to accommodate all the available channels, even when only a few of the channels are actually being used. Second, the software driver in the host processor tends to be inflexible and requires updates when the system is targeted to different applications and/or platforms.

Therefore, there is a need to have an audio controller that provides flexible control functionalities efficiently with less hardware.

SUMMARY

The present invention relates to a method and apparatus to control audio channels. The apparatus comprises a plurality of configuration registers and a corresponding plurality of channel logic circuits. The configuration registers configure usage of the audio channels. Coupled to the configuration registers, the channel logic circuits provide logic functions to the audio channels according to the configured usage.

BRIEF DESCRIPTION OF THE DRAWINGS

The features and advantages of the present invention will become apparent from the following detailed description of the present invention in which.

DESCRIPTION

The present invention is a method and apparatus for controlling audio channels in a digital audio controller. Configuration registers configure usage of the audio channels. A plurality of channel logic circuits are coupled to the corresponding configuration registers to provide logic functions to the audio channels according to the configured usage. The usage includes assignment, allocation, or mapping of the channel logic circuits to the audio channels. The technique provides an efficient use of hardware resources and flexibility in controlling audio devices.

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention.

Figure 1:
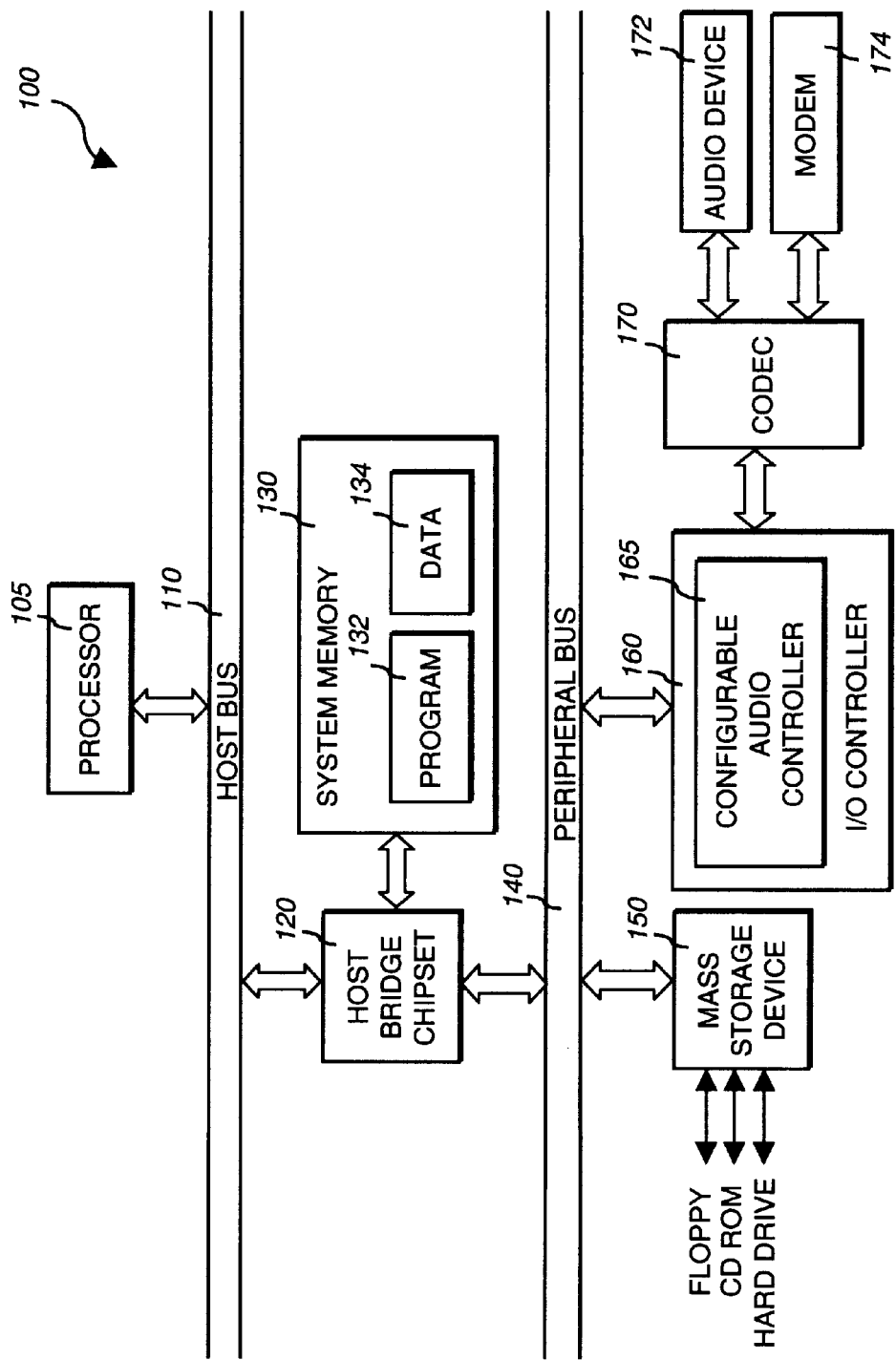
FIG. 1 is a diagram illustrating a computer system in which one embodiment of the invention can be practiced.

FIG. 1 is a diagram illustrating a computer system 100 in which one embodiment of the invention can be practiced. The computer system 100 include a processor 105, a host bus 110, a host bridge chipset 120, a system memory 130, a peripheral bus 140, a mass storage device 150, an input/output (I/O) controller 160, an audio codec 170, an audio device 172, and a modem 174.

The processor 105 represents a central processing unit of any type of architecture, such as complex instruction set computers (CISC), reduced instruction set computers (RISC), very long instruction word (VLIW), explicitly parallel instruction set computing (EPIC), or hybrid architecture. The invention could be implemented in a multi-processor or single processor computer system.

The host bridge chipset 120 includes a number of interface circuits to allow the host processor 105 access to the system memory 130 and the peripheral bus 140. The system memory 130 represents one or more mechanisms for storing information. For example, the system memory 130 may include non-volatile or volatile memories. Examples of these memories include flash memory, read only memory (ROM), or random access memory (RAM). The system memory 130 stores a program 132 and a data 134. Of course, the system memory 130 preferably contains additional software (not shown), which is not necessary to understanding the invention.

The mass storage device 150 include CD ROM, floppy diskettes, and hard drives. The mass storage device 150 stores non-volatile information such as programs or data. The mass storage device 150 provides a mechanism to read machine-readable media. When implemented in software, the elements of the present invention are essentially the code segments to perform the necessary tasks. The program or code segments can be stored in a processor readable medium or transmitted by a computer data signal embodied in a carrier wave, or a signal modulated by a carrier, over a transmission medium. The "processor readable medium" may include any medium that can store or transfer information. Examples of the processor readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

The I/O controller 160 provides an input/output interface to I/O devices. The I/O controller contains a configurable audio digital controller 165. The controller 165 performs control functions to the audio codec 170. The controller 165 receives input data streams and send output data streams from and to the codec 170. In one embodiment, the interface between the codec 170 and the I/O controller 160 is the AC '97 Data Link as specified in the AC '97 specification.

The codec 170 is an audio analog device that processes analog audio signals. The audio codec 170 includes a number of audio channels to carry audio signals. Examples of the audio channels include stereo pulse code modulation (PCM) signals, modem signal, microphones, etc. The audio device 172 includes audio components such as speakers, audio equipment, microphone, etc. The modem 174 is a communication device for data transmission.

Figure 2:
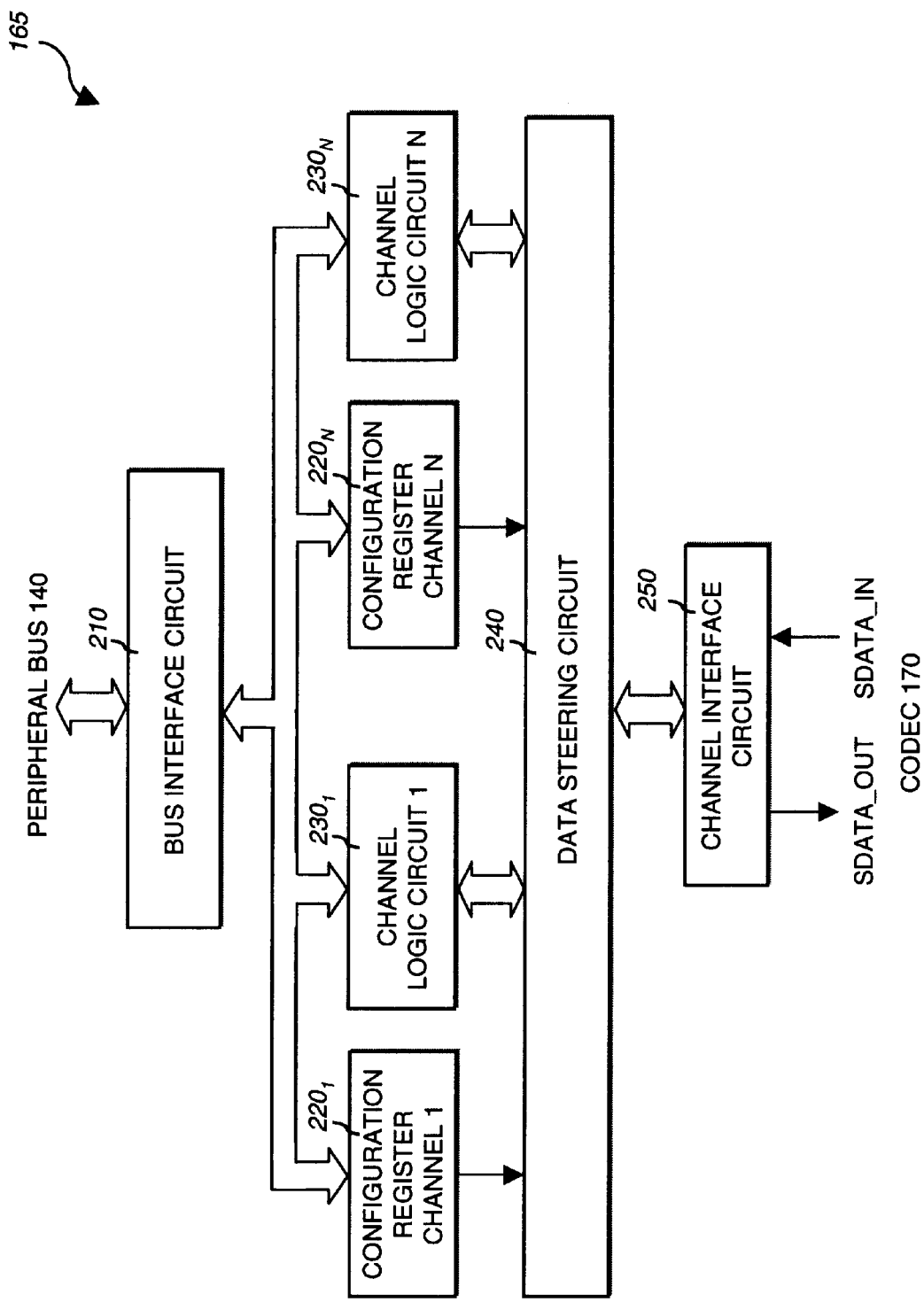
FIG. 2 is a diagram illustrating a configurable audio controller according to one embodiment of the invention.

FIG. 2 is a diagram illustrating a configurable audio controller 165 according to one embodiment of the invention. The configurable audio controller 165 includes a bus interface circuit 210, N configuration registers $220_1$ to $220_N$, N channel logic circuits $230_1$ to $230_N$, a data steering circuit 240, and a channel interface circuit 250. The number N of the configuration registers $220_1$ to $220_N$ and the channel logic circuits $230_1$ to $230_N$ is typically less than the number of available audio channels.

The bus interface circuit 210 provides an interface to the peripheral bus 140 shown in FIG. 1. The bus interface circuit 210 allows the host processor 105 shown in FIG. 1 to write configuration data to the configurations registers $220_1$ to $220_N$ to configure usage of the corresponding channels. The bus interface circuit 210 also allows the channel logic circuits $230_1$ to $230_N$ to access the system memory 130 shown in FIG. 1.

The configuration registers $220_1$ to $220_N$ store configuration data to configure usage of the corresponding channels. The configuration data include control bits in appropriate select fields to select the appropriate channels for sending or receiving audio data. The number of control bits in each configuration register is large enough to uniquely specify any one of the audio channels. The configuration registers $220_1$ to $220_N$ are also used with the corresponding channel logic circuits $230_1$ to $230_N$. The uses of the configuration registers $220_1$ to $220_N$ are mutually exclusive to avoid conflict in channel usage. To ensure mutual exclusion, a number of techniques can be used. One technique is to use a priority encoder to prioritize the channels. Another technique is to use a error checking circuit to check the contents of the corresponding select fields for duplications. The usage of the audio channels includes a mapping of the channel logic circuits $230_1$ to $230_N$ to the audio channels. This mapping may include an assignment of the control bits to the demultiplexers $410_1$ to $410_N$, and the multiplexers $420_1$ to $420_N$ shown in FIG. 4A. In addition, the usage also includes the configuration, initialization, or programming of the DMA controller 310, the output FIFO 320, and the input FIFO 330 shown in FIG. 3.

The channel logic circuits $230_1$ to $230_N$ provide the logic functions to support the operation of the selected audio channels. The channel logic circuits $230_1$ to $230_N$ are coupled to the data steering logic 240 to receive and send the digital data stream from the audio channels. The data steering circuit 240 steers the data flow between the channel logic circuits $230_1$ to $230_N$ and the audio channels according to the configured usage. The channel interface circuit 250 provides the interface between the data steering circuit 240 and the serial output and input data streams to and from the audio channels.

Figure 3:
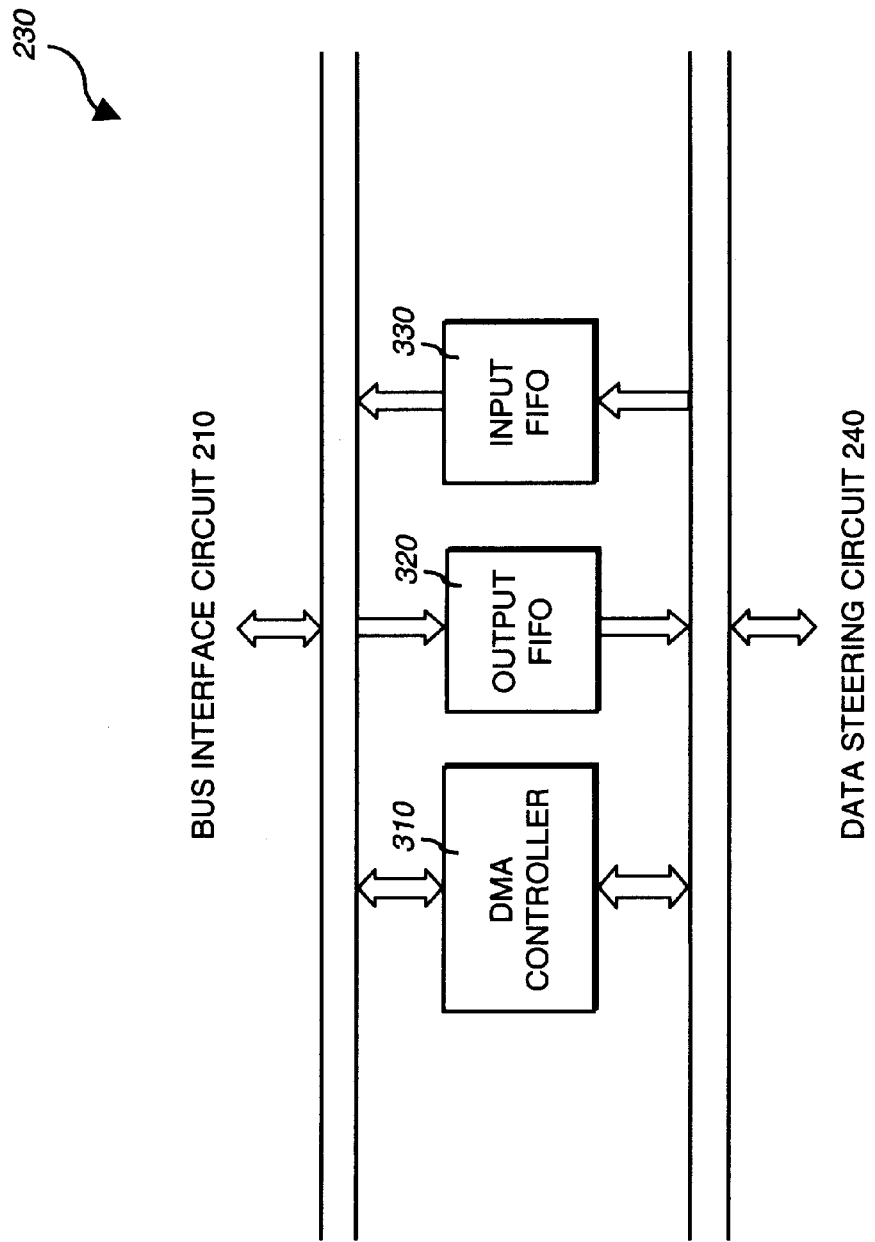
FIG. 3 is a diagram illustrating a channel logic circuit according to one embodiment of the invention.

FIG. 3 is a diagram illustrating a channel logic circuit 230 according to one embodiment of the invention. The channel logic circuit 230 includes at least a direct memory access (DMA) controller 310, an output first-in-first-out (FIFO) 320, and an input FIFO 330. It is contemplated that other logic functions can also be provided.

The DMA controller 310 provides direct memory access to a memory of a host processor. As an example, the DMA controller 310 provides a direct memory access to the system memory 130 shown in FIG. 1.

The output FIFO 320 is a local fast memory used as a queue to buffer output data to be sent to the audio channels in the serial output data stream. In one embodiment, the output data are obtained from the system memory 130 shown in FIG. 1 via the DMA controller 310. Alternatively, the output data can also be written directly by the host processor 105 shown in FIG. 1.

The input FIFO 330 is a local fast memory used as a queue to buffer input data received from the audio channels in the serial input data stream. In one embodiment, the input data are transferred to the system memory 130 shown in FIG. 1 via the DMA controller 310. Alternatively, the input data can also be read directly by the host processor 105 shown in FIG. 1.

The DMA controller 310, the output and input FIFOs 320 and 330 therefore provide an efficient and fast mechanism for the digital audio controller 165 to serve the selected audio channels. In DMA mode, once the DMA controller 310 is programmed by the host processor 105, the output and input data can be transferred without interruption from the host processor 105 at the appropriate times.

Figure 4A:
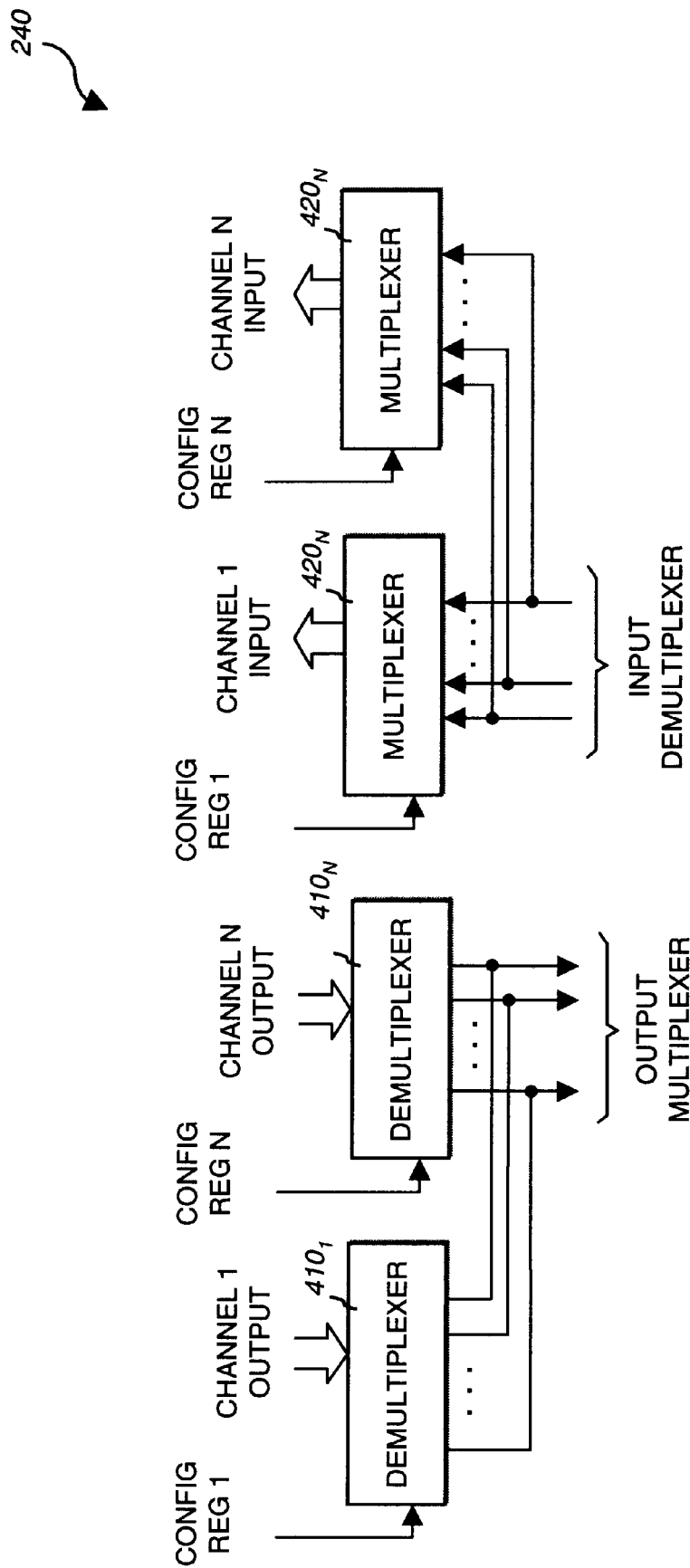
FIG. 4A is a diagram illustrating a data steering circuit according to one embodiment of the invention.

FIG. 4A is a diagram illustrating a data steering circuit 240 according to one embodiment of the invention. The data steering circuit 240 includes N demultiplexers $410_1$ to 410N and N multiplexers $420_1$ to $420_N$.

The demultiplexers $410_1$ to $410_N$ receives data from the corresponding channel logic circuits $230_1$ to $230_N$. In addition, the demultiplexers $410_1$ to $410_N$ also receive control bits from the corresponding configuration registers $220_1$ to $220_N$. Each of the demultiplexers $410_1$ to $410_N$ demultiplexes the output data from the corresponding channel logic circuit based on the contents of the corresponding configuration register in $220_1$ to $220_N$. The corresponding outputs of the demultiplexers $410_1$ to $410_N$ are tied together. For example, output 1 of all demultiplexers $410_1$ to $410_N$ are tied together, output 2 of all demultiplexers $410_1$ to $410_N$ are tied together, etc. The details of one embodiment of the demultiplexer $410_1$ to $410_N$ are shown in FIG. 4B.

The multiplexers $420_1$ to $420_N$ receive the input data from the channel interface circuit 250 shown in FIG. 2. In addition, the multiplexers $420_1$ to $420_N$ also receive control bits from the corresponding configuration registers $220_1$ to $220_N$. Each of the multiplexers $420_1$ to $420_N$ multiplexes input data based on the contents of the corresponding register in $220_1$ to $220_N$. The corresponding inputs of the multiplexers $420_1$ to $420_N$ are tied together. For example, the input 1 of all multuplexers $420_1$ to $420_N$ are tied together, input 2 of all multiplexers $420_1$ to $420_N$ are tied together, etc.

Figure 4B:
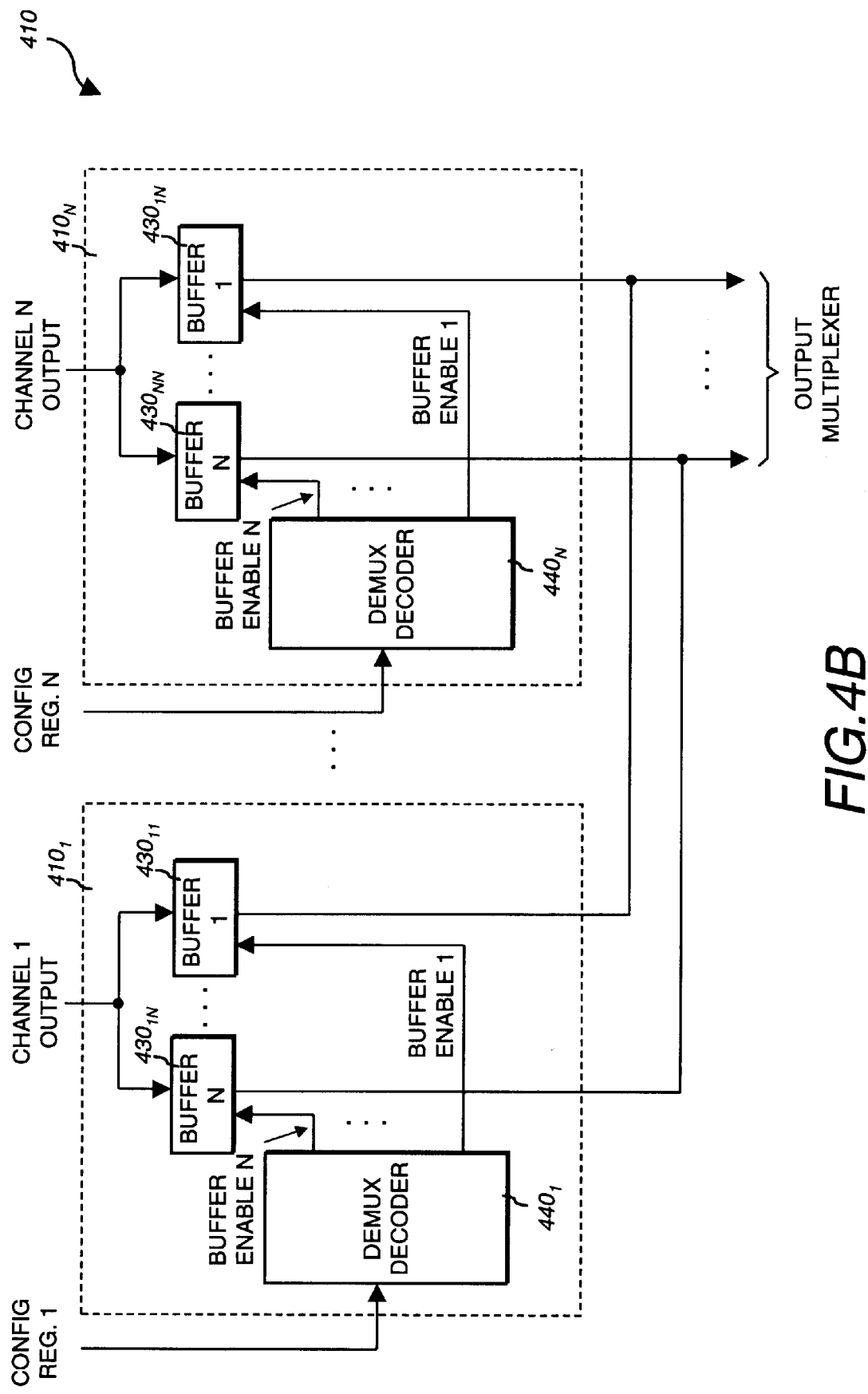
FIG. 4B is a diagram illustrating demultiplexers 410 according to one embodiment of the invention.

FIG. 4B is a diagram illustrating demultiplexers 410 according to one embodiment of the invention. The demultiplexers $410_1$ to $410_N$ are preferably identical. Therefore, it is sufficient to describe a representative circuit, e.g., the demultiplexer $410_1$. The demultiplexer $410_1$ includes N buffers $430_1$ to $430_N$ and a demultiplexer decoder $440_1$.

Each of the buffers $430_{11}$ to $430_{1N}$ receives the same data from the channel 1 output. The buffers $430_{11}$ to $430_{1N}$ are preferably tri-state devices. The buffer outputs in the demultiplexer $410_1$ are tied to the corresponding buffer outputs in other demultiplexers. Each of the buffers $430_{11}$ to $430_{1N}$ is enabled by the buffer enable signals from the demultiplexer decoder $440_1$. The inputs to the demultiplexer decoder $440_1$ is a proper channel select field in the configuration register $220_1$.

The demultiplexers $410_1$ to $410_N$ effectively steer the N channel outputs from the channel logic circuits $230_1$ to $230_N$ to any of the audio channels as selected by the corresponding select field in the configuration registers.

For example, suppose it is desired to configure the channel logic circuit $230_1$ to support the audio channel 5 and the channel logic circuit $230_4$ to support the audio channel 3. Then the configuration register $220_1$ is programmed by the host processor 105 to contain the audio channel address 5 at appropriate select field. The configuration register $220_1$ controls the demultiplexer $410_1$. Similarly, the configuration register $220_4$ is programmed to contain the audio channel address 3 at the appropriate select register. The configuration register $220_4$ controls the demultiplexer $410_4$.

In the demultiplexer $410_1$, the demultiplexer decoder $440_1$ receives the channel address value 5 and decodes to activate the buffer enable 5 signal, while deactivating all other buffer enable signals. Therefore, only buffer $5430_{15}$ is enabled and the rest of the buffers are disabled, floating the buffer outputs (i.e., driving the outputs to the high impedance state). Similarly, in the demultiplexer $410_4$, the demultiplexer $440_4$ receives the channel address value 3 and decodes to activate the buffer enable 3 signal, while deactivating all other buffer enable signals. Therefore, only buffer 3 $430_{43}$ is enabled and the rest of the buffers are disabled, floating the buffer outputs.

In this manner, the output 3 of the data steering circuit 240 carries the output of the channel logic circuit $230_4$, and the output 5 of the data steering circuit 240 carries the output of the channel logic circuit $230_1$. In this example, all other outputs of the data steering circuit 240 are in high impedance state, or floating. It is noted that since the select fields in the configuration registers $220_1$ to $220_N$ are mutual exclusive, it is guaranteed that there is no contention on the buffer outputs.

Figure 5:
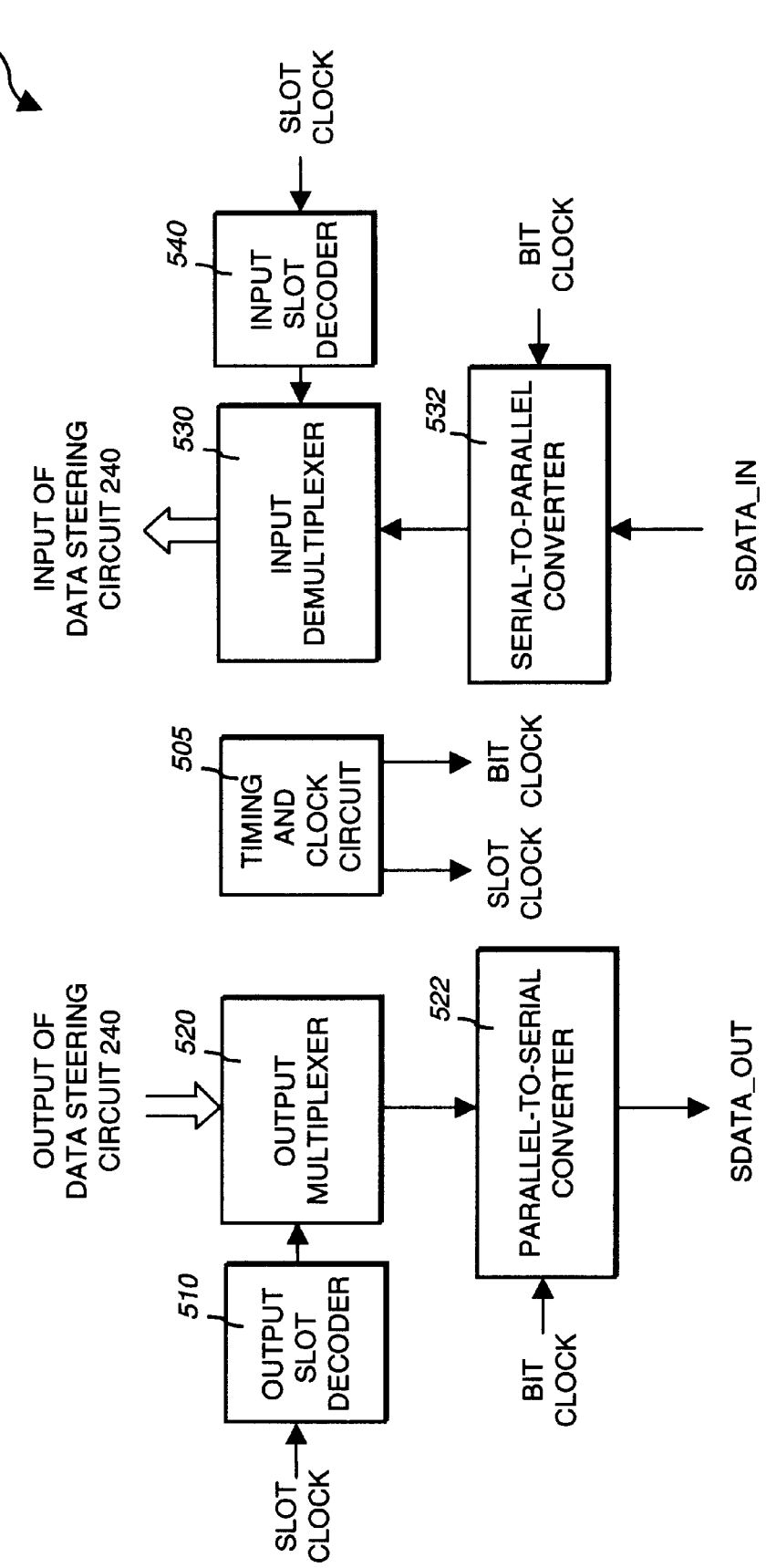
FIG. 5 is a diagram illustrating a channel interface circuit 250 according to one embodiment of the invention.

FIG. 5 is a diagram illustrating a channel interface circuit 250 according to one embodiment of the invention. The channel interface circuit 250 includes a timing and clock circuit 505, an output slot decoder 510, an output multiplexer 520, a parallel-to-serial converter 522, an input demultiplexer 530, a serial-to-parallel converter 532, and an input slot decoder 540.

The output slot decoder 510, the output multiplexer 520 and the parallel-to-serial converter 522 form the output interface. The output interface receives N outputs from the data steering circuit 240 shown in FIG. 2 to generate the serial output data in the audio data link. The input demultiplexer 530, the serial-to-parallel converter 532, and the input slot decoder 540 form the input interface.

The input interface receives the serial input data in the audio data link and generate N inputs to the data steering circuit 240.

The timing and clock circuit 505 generates clock signals to various components in the channel interface circuit 250. The timing and clock circuit 505 may receives the basic bit clock that synchronize the serial data streams. The bit clock is gated and or qualified with the SYNC signal as specified in the audio channel specification. The bit clock can be divided by P to provide a slot clock signal where P is an integer number indicating the number of bits per channel or slot in the audio system. In one embodiment, the number of bits at each slot is 20 according to the AC '97 specification. The basic bit clock is used to clock the parallel-to-serial converter 522 and the serial-to-parallel converter 532.

The output slot decoder 510 generates a select signal to the output multiplexer 520. The output multiplexer 520 generates the selected output to the parallel-to-serial converter 522. The parallel-to-serial converter 522 converts the parallel data to a serial data stream according to the bit clock. The output slot decoder 510 incrementally selects the slot data according to the timing requirements of the audio specification. In one embodiment, the output slot decoder 510 is a K-modulo counter clocked by the slot clock signal where K is an integer indicating the number of slots in the audio system. In one embodiment, the number of slots is 12 according to the AC '97 specification. The slot clock signal is a divide-by-P signal from the serial bit clock.

Similarly, the input slot decoder 540 generates a select signal to the input demultiplexer 530. The serial-to-parallel converter 532 converts the serial data stream to a parallel data according to the bit clock. The input demultiplexer 530 generates the selected input to the data steering circuit 240. The input slot decoder 540 incrementally selects the slot data according to the timing requirements of the audio specification. In one embodiment, the input slot decoder 540 is a K-modulo counter clocked by the slot clock signal where K is an integer indicating the number of slots in the audio system. In one embodiment, the number of slots is 12 according to the AC '97 specification.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method comprising:
   configuring usage of audio channels by a plurality of configuration registers;
   providing logic functions to the audio channels according to the configured usage by a plurality of channel logic circuits, the configured usage including a mapping of the plurality of channel logic circuits to the audio channels;
   steering data flow between the channel logic circuits and the audio channels according to the configured usage by a data steering circuit;
   interfacing between the data steering circuit and the audio channels by a channel interface circuit; and
   interfacing to a host processor and a memory by a bus interface circuit, the host processor writing configuration data to one of the configuration registers to configure the usage of one of the audio channels; wherein providing the logic functions comprises:

providing direct memory access (DMA) to a memory coupled to the host processor by a DMA controller; and queuing data of the audio channels in a first-in-first-out (FIFO) memory.

2. The method of claim 1 wherein queuing comprises:

storing output data from the host processor in an output FIFO; and storing input data from the audio channels in an input FIFO.

3. The method of claim 1 wherein steering comprises:

demultiplexing the output data from the channel logic circuits to the channel interface circuit by a plurality of demultiplexers.

4. The method of claim 1 wherein steering comprises:

multiplexing input data from the channel interface circuit to the channel logic circuits by a plurality of multiplexers.

5. The method of claim 3 wherein interfacing between the data steering circuit and the audio channels comprises:

generating an output slot synchronization signal synchronous with output slot timing signals of the audio channels by an output slot decoder; and multiplexing the channel output data according to the output slot synchronization signal by an output multiplexer.

6. The method of claim 4 wherein interfacing between the data steering circuit and the audio channels comprises:

generating an input slot synchronization signal synchronous with input slot timing signals of the audio channels by an input slot decoder; and generating the channel input data from the audio channels according to the input slot synchronization signal by an input demultiplexer.

7. The method of claim 1 wherein the audio channels are provided by an audio codec.

8. An apparatus comprising:

a plurality of configuration registers to configure usage of audio channels;

a plurality of channel logic circuits coupled to the corresponding configuration registers to provide logic functions to the audio channels according to the configured usage, the configured usage including a mapping of the plurality of channel logic circuits to the audio channels;

a data steering circuit coupled to the configuration registers and the channel logic circuits to steer data flow between the channel logic circuits and the audio channels according to the configured usage;

a channel interface circuit coupled to the data steering circuit to provide interfacing between the data steering circuit and the audio channels; and a bus interface circuit coupled to the channel logic circuits and the configuration registers to interface to a host processor and a memory, the host processor writing configuration data to one of the configuration registers to configure the usage of one of the audio channels; wherein the channel logic circuit comprises:

a direct memory access (DMA) controller to provide DMA to a memory coupled to the host processor; and a first-in-first-out (FIFO) memory to queue data of the audio channels.

9. The apparatus of claim 8 wherein the FIFO memory comprises:

an output FIFO to store output data from the host processor; and an input FIFO to store input data from the audio channels.

10. The apparatus of claim 8 wherein the data steering circuit comprises:

a plurality of demultiplexers coupled to outputs of the channel logic circuit and the configuration registers to demultiplex the output data from the channel logic circuits to the channel interface circuit.

11. The apparatus of claim 8 wherein the data steering circuit comprises:

a plurality of multiplexers coupled to inputs of the channel logic circuit and the configuration registers to multiplex input data from the channel interface circuit to the channel logic circuits.

12. The apparatus of claim 10 wherein the channel interface circuit comprises:

an output slot decoder to generate an output slot synchronization signal synchronous with output slot timing signals of the audio channels; and an output multiplexer coupled to the data steering circuit and the output slot decoder to multiplex the channel output data according to the output slot synchronization signal.

13. The apparatus of claim 11 wherein the channel interface circuit comprises:

an input slot decoder to generate an input slot synchronization signal synchronous with input slot timing signals of the audio channels; and an input demultiplexer coupled to the data steering circuit and the input slot decoder to generate the channel input data from the audio channels according to the input slot synchronization signal.

14. The apparatus of claim 8 wherein the audio channels are provided by an audio codec.

15. A system comprising:

a host processor;

a memory coupled to the host processor;

a peripheral bus coupled to the host processor;

a codec processor coupled to the peripheral bus to process audio signals via a plurality of audio channels;

a controller coupled to the codec processor and the peripheral bus to control the audio channels, the controller comprising:

a plurality of configuration registers to configure usage of the audio channels, a plurality of channel logic circuits coupled to the corresponding configuration registers to provide logic functions to the audio channels according to the configured usage, the configured usage including a mapping of the plurality of channel logic circuits to the audio channels, a data steering circuit coupled to the configuration registers and the channel logic circuits to steer data flow between the channel logic circuits and the audio channels according to the configured usage, a channel interface circuit coupled to the data steering circuit to provide interfacing between the data steering circuit and the audio channels, and a bus interface circuit coupled to the channel logic circuits and the configuration registers to interface to the host processor and the memory, the host processor writing configuration data to one of the configuration registers to configure the usage of one of the audio channels; wherein the channel logic circuit comprises:
   a direct memory access (DMA) controller to provide DMA to a memory coupled to the host processor; and
   a first-in-first-out (FIFO) memory to queue data of the audio channels.

16. The system of claim 15 wherein the FIFO memory comprises:
   an output FIFO to store output data from the host processor; and
   an input FIFO to store input data from the audio channels.

17. The system of claim 15 wherein the data steering circuit comprises:
   a plurality of demultiplexers coupled to outputs of the channel logic circuit and the configuration registers to demultiplex the output data from the channel logic circuits to the channel interface circuit.

18. The system of claim 15 wherein the data steering circuit comprises:
   a plurality of multiplexers coupled to inputs of the channel logic circuit and the configuration registers to multiplex input data from the channel interface circuit to the channel logic circuits.

19. The system of claim 17 wherein the channel interface circuit comprises:
   an output slot decoder to generate an output slot synchronization signal synchronous with output slot timing signals of the audio channels; and
   an output multiplexer coupled to the data steering circuit and the output slot decoder to multiplex the channel output data according to the output slot synchronization signal.

20. The system of claim 18 wherein the channel interface circuit comprises:
   an input slot decoder to generate an input slot synchronization signal synchronous with input slot timing signals of the audio channels; and
   an input demultiplexer coupled to the data steering circuit and the input slot decoder to generate the channel input data from the audio channels according to the input slot synchronization signal.

21. The system of claim 15 wherein the audio channels are provided by an audio codec.

* * * * *

UNITED STATES PATENT AND TRADEMARK OFFICE
CERTIFICATE OF CORRECTION

PATENT NO. : 6,629,001 B1
DATED : September 30, 2003
INVENTOR(S) : Vadivelu

It is certified that error appears in the above-identified patent and that said Letters Patent is hereby corrected as shown below:

Column 4,
Line 4, delete "230, to 230,", insert -- $230_1$ to $230_N$ --.
Line 49, delete "410, to 410N,", insert -- $410_1$ to $410_N$ --.

Column 5,
Line 40, delete "$5430_{15}$", insert -- $5\ 430_{15}$ --.

Signed and Sealed this

Thirteenth Day of January, 2004

JON W. DUDAS
*Acting Director of the United States Patent and Trademark Office*